March 21, 1939.  L. H. SCURLOCK  2,151,535
COOKING UTENSIL
Filed March 4, 1937
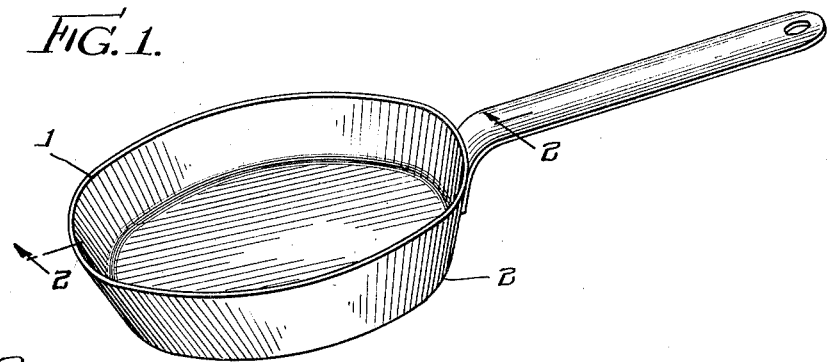
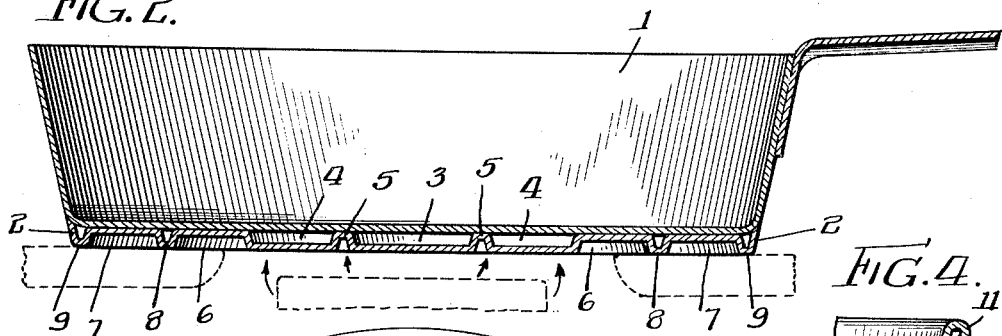
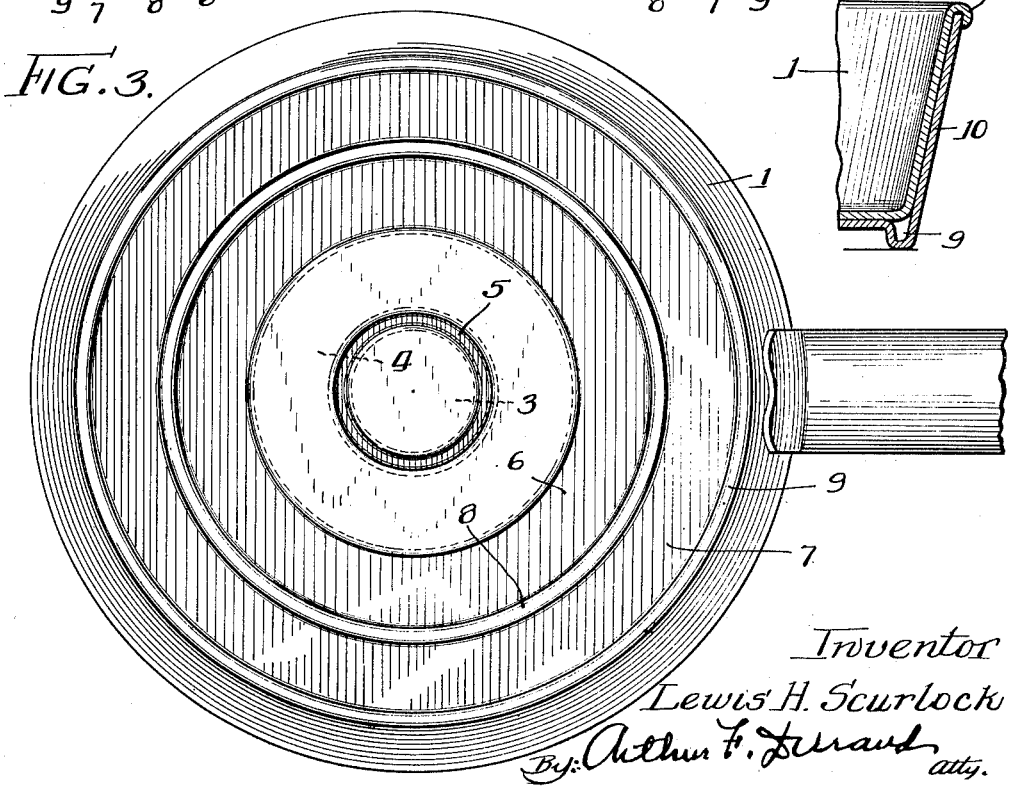
Inventor
Lewis H. Scurlock
By: Arthur F. Durand, atty.

Patented Mar. 21, 1939

2,151,535

UNITED STATES PATENT OFFICE 2,151,535

COOKING UTENSIL

Lewis H. Scurlock, Chicago, Ill.

Application March 4, 1937, Serial No. 128,911

11 Claims. (Cl. 53—7)

This invention relates to cooking utensils in general, such as those in which the frying and baking and boiling of various kinds of food is done, and more particularly to cooking utensils of this kind for use over a gas burner or other concentrated heating means.

Generally stated, the object of the invention is to provide a cooking utensil with a novel and improved bottom construction of such character that, when the utensil is used over a flame or other concentrated heating means, such as an ordinary gas burner, the heat will be distributed more uniformly throughout the area of the bottom, instead of being concentrated at the middle of the latter, thereby to insure better results in the cooking of the food.

It is also an object to provide certain details and features of construction tending to increase the general efficiency and desirability of a cooking utensil having a specially constructed bottom of this particular character.

To the foregoing and other useful ends, the invention consists in matters hereinafter set forth and claimed and shown in the accompanying drawing, in which—

Fig. 1 is a perspective of a cooking utensil provided with a bottom construction involving the principles of the invention.

Fig. 2 is an enlarged vertical section on line 2—2 in Fig. 1 of the drawing.

Fig. 3 is a bottom plan view of said utensil.

Fig. 4 is a detail or fragmentary sectional view showing a different form of the invention.

As thus illustrated, the invention is applied to an ordinary skillet or frying pan 1, made of any suitable or desired material. For the purpose of the invention, it can be made, for example, of stainless steel.

To the bottom of this cooking utensil, there is attached a substantially flat disk having upturned edge portions 2 that are welded or otherwise suitably united to the cooking utensil, at the bottom of the latter. This disk is formed on its upper side with a middle depression 3, preferably round, and with an annular or ringlike depression 4 encircling said middle depression, so that an upwardly extending annular bead 5 is provided, which firmly engages the bottom of the utensil. On the bottom of said disk, there is an annular inverted depression 6 encircling the previously mentioned depression 4, and also a second inverted depression 7, with a downwardly extending annular bead 8 between the annular depression 6 and the annular depression 7, whereby a plurality of annular channels are provided on the bottom of the disk, in the outer marginal portions thereof. A second annular bead 9 is formed on the bottom of said disk, by the formation of the upturned edge portions 2, and it will be seen that the two beads 8 and 9 are flush with the bottom walls of the depressions 3 and 4, as shown in Fig. 2 of the drawing.

Thus, the depressions 3 and 4 in effect provide dead air spaces between the disk and the bottom wall of the utensil, so that the middle portion of the bottom of the utensil does not heat as fast, or as quickly, as do the outer marginal portions thereof, as it will be seen that the top walls of the annular channels 7 and 8 bear tightly against the bottom wall of the cooking utensil. Thus, the flame of the gas burner, or other concentrated heating means, is spread in a manner that tends to distribute the heat uniformly in the bottom wall structure of the cooking utensil, instead of intensely heating the middle portion only, and instead of leaving marginal portions of the bottom to gather heat more slowly. In other words, the bottom structure of the ordinary cooking utensil is such that the heat is concentrated at the middle of the bottom where the flame strikes it, and this tends to cause improper cooking of the food, and even burning of the latter, where it contacts with the middle of the bottom. However, with the construction shown and described, the dead air spaces 3 and 4 protect the middle of the bottom against undue and concentrated heating, as the flame is spread outwardly into the channels 6 and 7, and in this way the middle of the bottom heats more slowly and practically no faster than the marginal portions of the bottom, thus tending to insure a more uniform distribution of the heat in the bottom of the utensil.

As shown in Figs. 1, 2 and 3, the entire structure can be made of stainless steel, or of any suitable metal, or the disk for the under side of the bottom can be made of copper and suitably fastened to the utensil, as copper transmits the heat faster than ferrous metals.

As shown in Fig. 4 of the drawing, the bottom attachment is provided with upwardly extending side walls 10, and the utensil is provided with rolled over upper edges 11 that tightly grip the annular upper edge of the side walls 10 of the attachment, and in this way the utensil and the attachment can be made of different metals. For example, the attachment can be made of copper, advantageously, as it will then not only transmit the heat uniformly over the bottom of the utensil, but also upwardly along the sides of the latter. The utensil itself can be made of stainless steel, aluminum, or any other suitable metal that can be attached, as shown, to the upper edge of the heat distributing attachment.

While it is preferable to form the heat distributing attachment separately, and to thereafter attach it to the utensil, it is obvious that the entire structure might be formed of one integral piece of metal.

With the construction shown and described, it will be seen that the bead formation 5 provides open air space on the bottom of the middle portion of the bottom structure, as this bead formation is hollow on the under side. Similarly, the bead formation 8 and 9 is also hollow, and thereby provides some dead air space in the marginal portion of the bottom. This marginal portion, it will be seen, is of two-ply thickness, as the top of the wide groove formation 6 and 7 has flatwise engagement with the underside of the main or upper bottom wall of the utensil. Thus, there is some dead air space in the two-ply marginal thickness of the bottom structure, and there is also some metallic engagement between the supplemental bottom wall and the under side of the main bottom wall, in the dead air space area.

With the construction shown and described, which is illustrative of one form of the invention, it will be seen that the distance from the outer edge of the groove 7 to the inner edge of the groove 6, these two grooves forming the concentric bottom surface groove formation for the marginal portion of the bottom, is substantially less than the total or over-all diameter of the entire dead air space 4, 3, and 4 provided for the middle portion of the bottom. In addition, it will be seen that the groove provided on the bottom of the rib 5 is of much less width than either the groove 6 or the groove 7, so that the bottom surface is provided with a plurality of concentric grooves of both relatively wide and narrow formation, and it will be understood that the invention is not limited to any particular number of grooves, or to any particular number of dead air spaces. Also, it will be understood that by the middle portion of the bottom is meant that portion which is surrounded by the concentric groove formation 6 and 7 of the marginal portion of the bottom of the utensil.

What I claim as my invention is:

1. A cooking utensil having a heat distributing formation for the bottom thereof, comprising concentrically arranged annular dead air spaces for the middle portion of the bottom, with means cutting off communication between said spaces, serving to minimize the metallic transmission of heat from the under surface to the upper surface of the bottom for the middle portion of the latter, and having a plurality of concentric channels formed on the under side of the marginal portion of the bottom, concentric to said middle portion, serving in effect to provide a maximum of metallic heat transmission from the under surface of said marginal portions to the upper surface thereof.

2. A structure as specified in claim 1, said bottom formation comprising an upper flat wall, and a separately formed lower wall having said air spaces and channels formed therein, with the outer edges of said lower wall turned up and hermetically sealed to the utensil.

3. A structure as specified in claim 1, said bottom formation comprising an upper flat wall, and a separately formed lower wall having said air spaces and channels formed therein, with the outer edges of said lower wall turned up and hermetically sealed to the utensil, said air spaces being separated by an upwardly projecting sheet metal bead formation, and said channels being formed by a downwardly projecting sheet metal bead formation.

4. In a cooking utensil, a sheet metal disk fastened to the flat bottom of the utensil, having a depressed middle portion in one plane, providing dead air space for the center of the bottom, between the latter and said depressed portion, and having its outer marginal portion in a plane above said middle portion, with flatwise engagement of said marginal portion with said bottom, said middle portion having a concentric bead formation that engages the bottom, providing one space that encircles another space.

5. In a cooking utensil, a sheet metal disk fastened to the flat bottom of the utensil, having a depressed middle portion in one plane, providing dead air space for the center of the bottom, between the latter and said depressed portion, and having its outer marginal portion in a plane above said middle portion, with flatwise engagement of said marginal portion with said bottom, said disk being separately formed and hermetically united at its rim to the utensil.

6. A cooking utensil having a substantially flat bottom provided with a concentric dead air space formation for the middle portion thereof, and with a concentric groove formation encircling said dead air space area, on the lower surface of said bottom, there being a plurality of concentric dead air spaces, and a plurality of concentric grooves for said groove formation.

7. A cooking utensil having a substantially flat bottom provided with a concentric dead air space formation for the middle portion thereof, and with a concentric groove formation encircling said dead air space area, on the lower surface of said bottom, said dead air space formation having also a concentric groove formation on the lower surface thereof.

8. A cooking utensil comprising a flat main bottom wall therefor, and a separately formed supplemental bottom wall on the lower surface of said main bottom wall, providing the latter with a concentric dead air space formation at the middle thereof, and with a concentric two-ply thickness marginal formation, said dead air space formation having a concentric bead formation that engages the main bottom, and that divides the air space into a plurality of separate non-communicating sealed air chambers.

9. A cooking utensil having a hollow bottom formed with a dead air space at the middle thereof, having a concentric dead air space encircling said middle space, the two spaces being closely separated by a concentric metal formation, and also having a plurality of concentric dead air spaces for the marginal portion of the bottom, separated less closely from each other, and from said first mentioned concentric space, by another concentric metal formation.

10. A cooking utensil having a substantially flat double wall bottom provided with a concentric dead air space formation for the middle portion thereof, and with a concentric groove formation encircling said dead air space area, on the lower surface of said bottom, there being a plurality of concentric dead air spaces, and a plurality of concentric grooves for said groove formation, the distance from the inside edge to the outside edge of said bottom surface groove formation being substantially less than the total or over-all diameter of the entire dead air space.

11. A cooking utensil having a substantially flat double wall bottom provided with a concentric dead air space formation for the middle portion thereof, and with a concentric groove formation encircling said dead air space area, on the lower surface of said bottom, said dead air space formation having also a concentric groove formation on the lower surface thereof, substantially narrower than any groove of the said first mentioned groove formation, so that both relatively wide and narrow concentric grooves are provided on the outside bottom surface of the utensil.

LEWIS H. SCURLOCK.